(12) United States Patent
Bacher et al.

(10) Patent No.: US 7,065,109 B2
(45) Date of Patent: Jun. 20, 2006

(54) LASER WITH NARROW BANDWIDTH ANTIREFLECTION FILTER FOR FREQUENCY SELECTION

(75) Inventors: Gerald D. Bacher, Carlsbad, CA (US); David E. Hargis, San Diego, CA (US)

(73) Assignee: Melles Griot Inc., Carlsbad, CA (US)

( * ) Notice: Subject to any disclaimer, the term of this patent is extended or adjusted under 35 U.S.C. 154(b) by 373 days.

(21) Appl. No.: 10/434,579

(22) Filed: May 8, 2003

(65) Prior Publication Data

US 2003/0235228 A1    Dec. 25, 2003

Related U.S. Application Data

(60) Provisional application No. 60/378,850, filed on May 8, 2002.

(51) Int. Cl.
 *H01S 3/10* (2006.01)
 *H01S 5/00* (2006.01)
(52) U.S. Cl. .................. 372/21; 372/22; 372/49.01
(58) Field of Classification Search ............... 372/21, 372/22, 98, 49.01
See application file for complete search history.

(56) References Cited

U.S. PATENT DOCUMENTS

| 3,853,386 A | 12/1974 | Ritter et al. |
| 4,009,453 A | 2/1977 | Mahlein |
| 4,099,840 A | 7/1978 | Van der Wal et al. |
| 4,132,959 A | 1/1979 | Bouwhuis et al. |
| 4,147,409 A | 4/1979 | Apfel |
| 4,201,954 A | 5/1980 | Van der Wal et al. |
| 4,309,075 A | 1/1982 | Apfel et al. |
| 4,340,969 A | 7/1982 | Hamilton et al. |
| 4,358,851 A | 11/1982 | Scifres et al. |
| 4,373,782 A | 2/1983 | Thelen |
| 4,378,599 A * | 3/1983 | Damen et al. ............ 372/43 |
| 4,482,209 A | 11/1984 | Grewal et al. |
| 4,545,646 A | 10/1985 | Chern et al. |

(Continued)

FOREIGN PATENT DOCUMENTS

EP    1230914    5/1971

(Continued)

OTHER PUBLICATIONS

"Infrared Narrow Bandpass Filters," product publication by Optical Coating Laboratory Ltd., 2001, 2 pgs.

*Primary Examiner*—Armando Rodriguez
(74) *Attorney, Agent, or Firm*—Law Offices of James D. McFarland

(57) ABSTRACT

A laser includes a narrow bandwidth AR coating for defining a frequency range for laser emission within the laser cavity. Advantageously, the narrow-band AR coating has a very low loss, which can be particularly useful if the gain medium has low gain. The narrow-band AR coating can be used to narrow the laser emission from a broadband gain medium (e.g. Cr:LiSAF), or to select from among discrete transition lines (e.g. Nd:YAG) without the use of cumbersome tuning elements. An etalon may be utilized to further narrow the fundamental wavelength, and the etalon may be substantially uncoated. For a solid state gain medium, the AR coating may be formed on one of the optical faces. A nonlinear element may be included for frequency-conversion, and the AR coating constrains the lasing frequency in the presence of this nonlinear loss and assists in maintaining single frequency operation to provide a stable frequency-converted output.

16 Claims, 8 Drawing Sheets

U.S. PATENT DOCUMENTS

| | | | |
|---|---|---|---|
| 4,615,033 A | 9/1986 | Nakano et al. | |
| 4,615,034 A | 9/1986 | Von Gunten et al. | |
| 4,800,568 A | 1/1989 | Krueger et al. | |
| 4,991,178 A | 2/1991 | Wani et al. | |
| 5,218,610 A | 6/1993 | Dixon | |
| 5,274,661 A | 12/1993 | Von Gunten et al. | |
| 5,506,860 A * | 4/1996 | Hyuga et al. | 372/98 |
| 5,572,542 A | 11/1996 | Dixon | |
| 5,577,058 A | 11/1996 | Kafka et al. | |
| 5,583,882 A | 12/1996 | Miyai et al. | |
| 5,684,623 A | 11/1997 | King et al. | |
| 5,757,827 A | 5/1998 | Makio et al. | |
| 5,825,793 A | 10/1998 | Miyai et al. | |
| 5,889,800 A | 3/1999 | Kafka et al. | |
| 5,940,419 A | 8/1999 | Xie | |
| 6,016,323 A | 1/2000 | Kafka et al. | |
| 6,047,010 A | 4/2000 | Makio et al. | |
| 6,115,401 A * | 9/2000 | Scobey et al. | 372/100 |
| 6,195,198 B1 * | 2/2001 | Hatori | 372/21 |
| 6,205,159 B1 | 3/2001 | Sesko et al. | |
| 6,233,260 B1 | 5/2001 | Makio et al. | |
| 6,295,305 B1 | 9/2001 | Matsumoto et al. | |
| 6,373,868 B1 | 4/2002 | Zhang | |
| 6,687,269 B1 * | 2/2004 | Rice et al. | 372/29.02 |
| 6,885,687 B1 * | 4/2005 | Hayakawa | 372/21 |
| 2002/0054614 A1 | 5/2002 | King et al. | |

FOREIGN PATENT DOCUMENTS

| | | |
|---|---|---|
| EP | 1523332 | 8/1978 |
| EP | 1557362 | 12/1979 |
| GB | 2091439 | 7/1982 |

\* cited by examiner

LASER WITH NARROW BANDWIDTH ANTIREFLECTION FILTER FOR FREQUENCY SELECTION

CROSS-REFERENCE TO RELATED APPLICATION

Priority is hereby claimed to U.S. Provisional Application No. 60/378,850, filed May 8, 2002, entitled NARROW BANDWIDTH, FREQUENCY SELECTIVE ANTIREFLECTION COATING FOR FREQUENCY SELECTION IN Cr:LiSAF, which is incorporated by reference herein in its entirety.

BACKGROUND OF THE INVENTION

1. Field of the Invention

The present invention generally relates to lasers, and particularly to spectral control systems for lasers that generate a narrow-band laser output.

2. Description of Related Art

Lasers are employed in a wide variety of uses: medical devices, communications, scientific research, holography, and laser light shows, for example. Generally, a laser is a device that emits high intensity monochromatic optical radiation, usually as a highly directional beam.

Broadly speaking, a laser device includes a gain medium situated within a laser cavity defined by two end mirrors and a pump source used to pump the gain medium to an energy state sufficient to support lasing operation. Many types of lasers have been developed: solid state lasers that utilize an optically-pumped gain media such as Nd:YAG, gas lasers in which a gas such as HeNe or argon is disposed within an electrical discharge tube, and semiconductor lasers that are pumped by an electrical current applied directly across the semiconductor material.

One important characteristic of a laser is its lasing wavelength, which is the wavelength of the fundamental laser emission within the laser cavity. The possible lasing wavelengths are determined by the particular gain medium implemented in a laser. Some gain media lase only on discrete transitions; for example a neodymium-doped solid state gain medium such as Nd:YAG may lase at any of a number of transitions such as 1064 nm, 1123 nm and 947 nm, and argon gas may lase at any of ab number of lines. Other gain media are broadband; for example Ti:sapphire (Ti:$Al_2O_3$) is a tunable solid state gain medium, chromium-doped solid state gain media such as Cr:LiSAF laser lase over a broad band of wavelengths that may extend 100 nm or more, and dyes are tunable over a range of about 20–70 nm.

For some gain media and in some simple low loss laser configurations, the strongest lasing transition will usually dominate the fundamental emission; for example the 1064 nm transition in Nd:YAG is strong enough that it will usually dominate the other nearby transitions. However for effective lasing operation and to provide a useful laser output (e.g. to select a transition other than the strongest transition, or to narrow the linewidth of the laser output) it is usually necessary to restrict the lasing wavelength in some way; i.e. some type of spectral control is usually required.

Accordingly, many lasers incorporate some type of spectral selection system in order to control the spectral content of the laser emission within the laser cavity. One common spectral selector is an etalon, which comprises an optical material that has two opposing parallel optical surfaces with a finite reflectivity. An etalon can be useful to narrow the linewidth and select a particular transition in a gain medium that lases on discrete transitions; however, for broadly-tunable gain media an etalon cannot select a single wavelength; instead it selects a series of lasing wavelengths within the gain-bandwidth of the particular gain medium. It is known that an etalon selects a periodically-repeating series of maxima determined by FSR of the etalon; and practical limitations prevent a FSR greater than about 15 nm @1 micron.

Another type of spectral selection system is a wavelength-selective reflective mirror. For example, U.S. Pat. No. 4,615,034 to von Gunten et al. discloses a wavelength selective mirror that provides single wavelength operation of a gas laser whose gain medium has discrete transitions; particularly, an output coupler is disclosed that allows oscillation of the 488 nm line of the argon blue/green spectrum while suppressing all other lines in that spectrum. In that application, the filter is functioning as the output coupler of the laser cavity, and requires a well-controlled transmission at the wavelength of interest for the laser to function properly. Additionally, bandwidth and minimum transmission of such a filter are determined by the refractive indices of the coating materials. These two parameters impose different requirements on the relative refractive indices of the materials, which can sometimes be overcome by increasing the number of coating layers. However, for very low transmission optics, the coatings can become too thick, which can significantly compromise performance and make fabrication difficult.

Narrow-band bandpass filters have been used, such as disclosed in U.S. Pat. No. 5,274,661 to select transition lines in gain media by blocking all but one transmission peak. In such narrow bandpass filters, although the objective is to render the transmission spike extremely narrow and with an extremely high transmittance, in practice the maximum reflectance (e.g., 5–10%) still is significantly greater than an AR coating (e.g., <0.2%). Another example of a narrow-band filter is disclosed in U.S. Pat. No. 4,800,568, which discloses a gas ion laser with a Brewster window coated for suppression of unwanted laser frequencies to produce a narrow band Brewster window.

Another common spectral selection system utilizes a birefringent filter (BRF) within the cavity. One example of a birefringent filter includes a birefringent material such as quartz set at Brewster's angle to the optical axis. However, a BRF is highly sensitive to small, normal changes in the laser cavity. Furthermore, in some lasers such as frequency-converted lasers, the presence of other birefringent materials (which may be intentionally made with small wedge angles) in the cavity makes such a BRF even more difficult to implement. Also, because the wavelength selectivity of a BRF is highly sensitive to beam divergence, any beam divergence unfortunately broadens the bandwidth, and thus use of a BRF is difficult to implement in a compact solid-state laser cavity. Particularly, any divergence of the beam causes the optical path length through the BRF to vary transversely across the beam; accordingly the wavelengths of the peak transmission will also vary transversely across the beam. Therefore, for all these reasons, a BRF has serious limitations that prevent its effective utilization.

Still another common spectral selection method utilizes one or more prisms situated within an optical cavity. Such prisms have long been used on argon ion lasers for example. Although prisms can be effective in long cavities (e.g. >20 cm), prisms are not a practical solution in smaller, highly diverging cavities because the beam divergence is greater than their dispersion. Particularly, prisms are simply not wavelength-selective enough in compact cavities. Furthermore, a prism system can be expensive, can cause temperature stability problems, and adds to the complexity of the laser device.

The above-described spectral control systems are useful to select a desired lasing wavelength and/or to narrow the linewidth. However, even with these spectral control systems many wavelengths are simply not achievable in a practical, cost-effective laser due to gain-bandwidth limitations of the gain medium and practical pump source limitations, particularly within small length and size limitations that are attractive to users. For example, laser diodes are currently the most practical pumping sources for solid state lasers. However, the available wavelengths of laser diodes suitable for pumping are limited, and because in most practical lasers the available output wavelengths are restricted by the pumping wavelength, the laser diode wavelength limitations also limit the available laser emission, which correspondingly restricts the available output wavelengths of non-frequency converted lasers.

To the end user, the output wavelength can be important; for example a short wavelength (e.g. blue) is more useful for creating compact discs (CDs) than a longer wavelength (e.g. infrared). Additionally, many biosciences applications utilize dyes that are only sensitive within certain narrow wavelength regions. In order to expand the available laser wavelengths, 1) tunable gain media have been developed, and 2) frequency conversion processes may be employed.

Cr:LiSAF is one example of a broadly tunable laser material (or "gain medium"), with reported laser emission from about 760 nm to about 1000 nm. Although broadly tunable ("broadband") laser materials generally require careful design to generate a single frequency output, their ability to generate a laser emission at any wavelength within a broad range of wavelengths can be an important advantage. Broadband gain media can be used in single frequency lasers; to obtain single wavelength operation in broadly tunable laser materials such as Cr:LiSAF, spectral selection methods such as a BRF may be utilized to select a particular wavelength within the wide spectrum under the gain curve. Broadband gain media such as Cr:LiSAF are typically low gain because of the nature of the transitions involved. Additionally, their absorption length is intentionally limited due to thermal and material constraints: too high a doping level can impair the optical quality of the material, and if the gain crystal heats up too much, thermal lensing can adversely affect the cavity and thermal quenching can limit laser activity. However, due to this low gain, it can be difficult to generate effective lasing oscillation, especially at wavelengths away from the peak gain. There are some disadvantages over the typical gain media that operate on discrete transitions For example, broadband materials like Cr:LiSAF and Ti:Al$_2$O$_3$ almost always have lower gain than discrete-transition materials like Nd:YAG, Nd:YVO4, and Yb:YAG, an therefore require a longer gain medium to accomplish a target gain, which complicates the mode-matching requirements to efficiently pump a single (TEM$_{00}$) lasing mode.

To provide laser emission at wavelengths that are not within the gain-bandwidth of a practical gain media, frequency conversion processes have been utilized. Frequency conversion is provided by a nonlinear element arranged within the laser cavity in a particular configuration. The most common frequency-conversion process is frequency doubling, which halves the wavelength; for example frequency doubling the 1064 nm line of Nd:YAG provides a frequency-doubled output of 532 nm.

Although the frequency conversion process advantageously increases the range of achievable output wavelengths, unfortunately frequency converted lasers are susceptible to severe output instabilities, due at partially to the laser's natural tendency to lase at the wavelength of lowest loss, and nonlinear interactions between multiple wavelength. It has been found that effective spectral selection of the fundamental emission can significantly reduce (or even eliminate) output instabilities in a frequency-converted laser. Particularly, if the spectral selection process can maintain single longitudinal mode operation of the fundamental emission, then the frequency doubling process can occur without (sometimes very large) output intensity variations that could otherwise occur. For some frequency-converted lasers, the spectral selection methods described above may be adequate to provide single frequency operation; for others, these methods may not be adequate or practical. Therefore there is a need for a more effective spectral control system, especially with broadband gain media, as discussed below.

In order to extend the range of available wavelengths, it has been suggested to utilize a broadband gain medium in a non-tunable frequency-doubled laser. It may be noted that, while broadband gain media are tunable, tunability is not a requirement for many lasers; furthermore, tunability of a frequency-converted laser is not feasible because changing the lasing wavelength would also require adjusting the phase matching angle in the LBO crystal, which would be difficult and costly to implement.

One previous design of a single wavelength, frequency-converted laser that uses a broadband gain medium is disclosed in U.S. Pat. No. 6,047,010 (the '010 patent). Specifically, the '010 patent discloses an intracavity doubled Cr:LiSAF laser that has three birefringent elements: a Cr:LiSAF crystal (the laser medium), an LBO crystal (a doubling material), and a birefringent filter (BRF). In one design this laser included a curved input mirror, an unwedged Cr:LiSAF crystal with broadband antireflection (BBAR) coatings, a BRF at Brewster's angle, an etalon, and a singly wedged LBO crystal cut to phase match type 1 near 860 nm with a BBAR on one surface and, on the other surface a high reflectivity (HR) coating at about 860 nm and a BBAR coating at about 430 nm. The wavelength of the laser was substantially determined by the relationship of the phase match cut to the HR surface of the LBO. The BRF was used to constrain laser operation to the wavelength range that could be efficiently doubled by the LBO with its surface functioning as one of the cavity mirrors. Finally, an intracavity etalon was used to provide single frequency, low noise operation.

In practice, this design proved difficult and costly to build. For example, accurately aligning the crystal axes with the Brewster plane of the BRF proved difficult, and furthermore much higher losses than expected were observed after inserting the BRF into the laser cavity. Also, the BRF had a high finesse requirement, and as a result it is technically difficult (or may even be impossible) to suppress unwanted lasing offset from the desired line by one free spatial range of the BRF. Furthermore, in operation this design had a very limited lifetime and therefore proved unreliable due to high sensitivity to very small movements of components. Therefore this design did not provide a practical laser at 430 nm.

It is believed that many of the problems with the laser disclosed in the '010 patent originate from complex interactions of the BRF with other cavity elements. Therefore, it would be advantageous to provide a way to obtain spectral control of the laser output of a frequency-converted laser without using a BRF.

One laser design uses a near-hemispherical cavity to allow a tight focus of the fundamental laser beam in the doubling crystal, and requires a significantly larger beam size in the gain medium to allow efficient mode matching to a highly multimode pump over the long interaction region required to absorb the pump in the Cr:LiSAF. This means that the fundamental laser beam is highly divergent in the region where the BRF would need to sit. This compromises the reflection reduction at Brewster's angle on the BRF, increasing the loss. To avoid this problem with a BRF would require a significantly longer cavity, not possible within certain size constraints.

SUMMARY OF THE INVENTION

A laser is disclosed that includes a narrow bandwidth AR coating to select a frequency range. Thus, by designing the narrow-band AR coating appropriately in connection with other intracavity losses, the wavelength output from a laser can be selected to provide a predetermined center wavelength with a narrow bandwidth. Advantageously, the narrow-band AR coating has a very low loss at the center wavelength, which can be particularly useful if the gain medium is low gain, such as a broadly tunable gain medium. It has been found that in some implementations, the build time for the laser can be significantly reduced, which advantageously saves costs.

The narrow-band AR coating can be used on any type of laser product (e.g., DPSSL products) that contains intracavity surfaces. The narrow-band AR coating can be used to constrain the output wavelength of a broadband (tunable) gain medium (e.g. Cr:LiSAF), or with other gain media to select from among closely spaced discrete lines (e.g. Nd:YAG at 946 nm vs. 939 nm) without the use of cumbersome tuning elements.

In one embodiment a narrow-band laser comprises a laser cavity, a gain medium that defines an available gain-bandwidth situated within the laser cavity, a pump source arranged to pump the gain medium to thereby excite laser emission within the laser cavity, and a narrow-band AR coating formed on a transmissive surface within the laser cavity, the narrow-band AR coating defining a minimum loss point of less than 2% within the available gain-bandwidth of the gain medium, the narrow-band AR coating limiting the bandwidth of the laser emission to a predetermined range around the minimum loss point. In some embodiments, the narrow-band AR coating, in conjunction with all other cavity losses, generates a fundamental emission that has a FWHM bandwidth less than about 2 nm, 1 nm, 0.5 nm, or 0.25 nm. The minimum loss point is lower than that of conventional bandpass filters, for example some embodiments have a minimum loss point of less than about 1%, 0.5%, 0.2%, or 0.1%.

An etalon may be situated within the laser cavity, the etalon having an FSR approximately matched with the spectral width of the narrowband AR coating so that the etalon has at most one transmission peak within the bandwidth of the laser emission. The etalon may be substantially uncoated. In some embodiments the laser emission can be made single frequency with the addition of a single low-loss etalon to the cavity. Also, it has been found, using low gain media such as Cr:LiSAF (e.g. a few percent per pass), that even a relatively small increase in reflectivity at wavelengths off the center of the notch (e.g. 0.1% within ±0.5 nm of the minimum) will force the laser to operate very near the center of the notch, which is believed to be due to the low available gain.

The gain medium comprises any suitable gain medium such as a solid state gain medium, and in some embodiments the AR coating is formed on at least one of the optical faces. The gain medium may provide only a low gain, for example less than about 4%). The gain medium may be broadband, for example chromium-doped solid state gain media such as Cr:LiSAF may be used. In other embodiments the gain medium may lase at discrete transitions for example neodymium-doped solid state gain media such as Nd:YAG may be used.

Any suitable pump source is included. For example the pump source may comprise an optical pump source arranged to end pump the gain medium, and means for focusing optical radiation from the optical pump source into the gain medium.

In one embodiment, a stable frequency-converted laser comprises a laser cavity including a first and a second end mirror, a gain medium situated within the laser cavity, the gain medium defining an available gain-bandwidth, a pump source arranged to pump the gain medium to thereby excite laser emission within the laser cavity, a nonlinear element situated within the laser cavity, the nonlinear element arranged for frequency conversion of the laser emission within a required spectral range, a narrow-band AR coating formed on a transmissive surface within the laser cavity, the narrow-band AR coating defining a minimum loss point within the available gain-bandwidth of the gain medium and an etalon situated within the laser cavity, in a configuration in which the etalon and the narrow-band AR coating cooperate to limit the bandwidth of the laser emission within the required spectral range for frequency conversion. The gain medium and the laser cavity may be arranged to suppress at least adjacent longitudinal modes by spatial hole burning, for example three to five adjacent longitudinal modes may be suppressed. The fundamental emission may be substantially single frequency, which is highly advantageous for the frequency conversion process, and the single frequency can be limited within a wavelength range required for efficient frequency conversion. The frequency-converted laser may be implemented as a frequency-doubled laser to provide, for example, a blue (about 430 nm) laser output from the fundamental emission of Cr:LiSAF at about 860 nm.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

Figure 1:
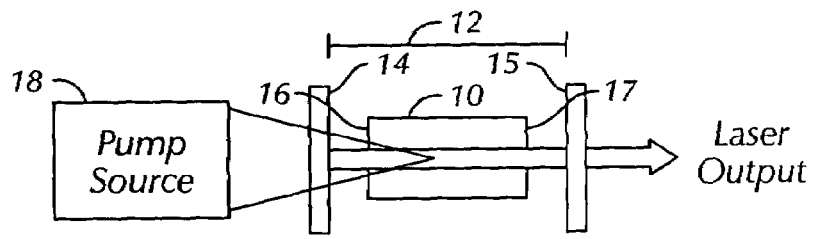
FIG. 1 is a side view of a laser that includes a gain medium with one of its surfaces coated with a narrow-band AR filter.

This invention is described in the following description with reference to the Figures, in which like numbers represent the same or similar elements.

Glossary of Terms and Acronyms

The following terms and acronyms are used throughout the detailed description:

| | |
|---|---|
| AR coating | anti-reflective coating |
| BRF | birefringent filter |
| Cr:LiSAF | chromium-doped lithium strontium aluminum fluoride: a broadly tunable gain material (n = 1.41 @860 nm) |
| cw | continuous wave (non-pulsed) laser operation |
| DPSSL | diode-pumped solid state laser |
| finesse of etalon | ratio of the separation of adjacent transmission maxima to the FWHM |
| FSR | free spectral range ($\approx c/2n\,L$) |
| FWHM | full width half maximum |
| LBO | lithium triborate (a nonlinear material) (n = 1.61 @860 nm) |
| YAG | yttrium aluminum garnet (n = 1.82 @860 nm) |

Overview

It has been found that narrow-band AR coatings on transmissive intracavity surfaces can be used to significantly narrow the bandwidth of a laser emission within a laser cavity without introducing problems due to polarization effects, which can be advantageous for a variety of uses. In one impementation, a narrow-band AR coating is utilized in a frequency-converted laser together with an etalon to promote single longitudinal mode operation and therefore provide a stable, frequency-converted laser output.

The narrow-band coatings described herein are different from the broadband AR coatings designed primarily to reduce surface reflections (and thereby reduce loss) in laser cavities, and are not suitable for frequency selection. Conventional AR coatings used in laser cavities are broadband coatings, designed to reduce surface reflections within the laser cavity. Surface reflections may arise from a variety of processes such as Fresnel reflection. Conventional broadband coatings may have a bandwidth (under 0.1%) of 25 nm or more. One type of AR coating (a "two layer v-coating") may have a bandwidth (under 0.1%) in the range of 15–20 nm or more. These broadband coatings are too broad for effective frequency selection, and too broad to be effectively utilized in combination with other elements (such as etalons) to provide single frequency operation. Furthermore, such broadband AR coatings are designed broadband to provide the highest transmission (i.e. lowest reflectivity) possible and thereby provide the least possible loss, and to allow for manufacturing errors; particularly, manfacturing tolerances for AR coatings are not precise, and therefore conventional AR coatings are made broadband to ensure that they are antireflective at the desired frequency.

Furthermore, the narrow-band AR coatings described herein are different from the narrow-band bandpass filters sometimes used to select a lasing transition. Particularly, the narrow-band AR coatings described herein do not have a large increase in reflectivity on either side of the center wavelength, in accordance with AR coating characteristics.

The narrow-band AR coating on an intracavity surface can be used on any type of laser product (e.g., other DPSSL products, gas lasers, and so forth) that contains intracavity surfaces. The narrow-band AR coating can be used to narrow the output wavelength of a broad band (tunable) gain medium (e.g. Cr:LiSAF), or with other gain media to select from among closely spaced discrete lines (e.g. Nd:YAG at 946 nm vs. 939 nm) without the use of cumbersome tuning elements.

Description

FIG. 1 is a side view of a laser that includes a gain medium 10 situated within a laser cavity 12 defined between a first end mirror 14 and a second end mirror 15. In one implementation, the gain medium comprises a solid state gain medium that has a first surface 16 proximate to the first mirror and a second surface 17 opposite thereto, and at least one these surfaces is coated with a narrow-band AR filter described herein. The other surface may be coated with a standard AR coating to reduce reflections. Excellent results have been achieved using a solid state gain medium with the narrow-band AR coating coated on the second surface 17.

The solid state gain medium may be a broadband gain medium such as Cr:LiSAF, Ti:Al$_2$O$_3$, Alexandrite, Cr:Forsterite, or Cr:LiSGAF (in which case the narrow-band AR filter is used to select a frequency range), or it may be a gain medium such as Nd:YAG or Nd:YLF (e.g. a rare-earth doped gain medium) that has a series of discrete lines (in which case the narrow-band AR filter is used to select one of a series of closely-spaced lines). However, in other embodiments the gain medium might not be solid state; for example it may comprise gas or liquid.

In some embodiments it may be convenient to coat the gain medium with the narrow-band AR coating for reasons such as cost and difficulty of coating. However, the narrow-band AR coating may be formed on an optical element other than the gain medium; for example the narrow-band AR coating may be formed on one of the end mirrors, or it may be formed on an additional intracavity optical element (such as a piece of optical glass or a nonlinear element) in which case it removes the requirement to place the optical surface at Brewster's angle such as disclosed in U.S. Pat. No. 4,800,568.

A suitable pump source 18 is provided to pump the gain medium; for example if a solid state gain medium is used, then an optical pump source such as a laser diode (or an array of laser diodes) may be utilized in an arrangement to end-pump the gain medium through the first end mirror. However any other pumping arrangement may be used; for example some embodiments may use side-pumping, and other types of pump sources may be used, depending upon the gain medium chosen for a particular embodiment.

Figure 2:
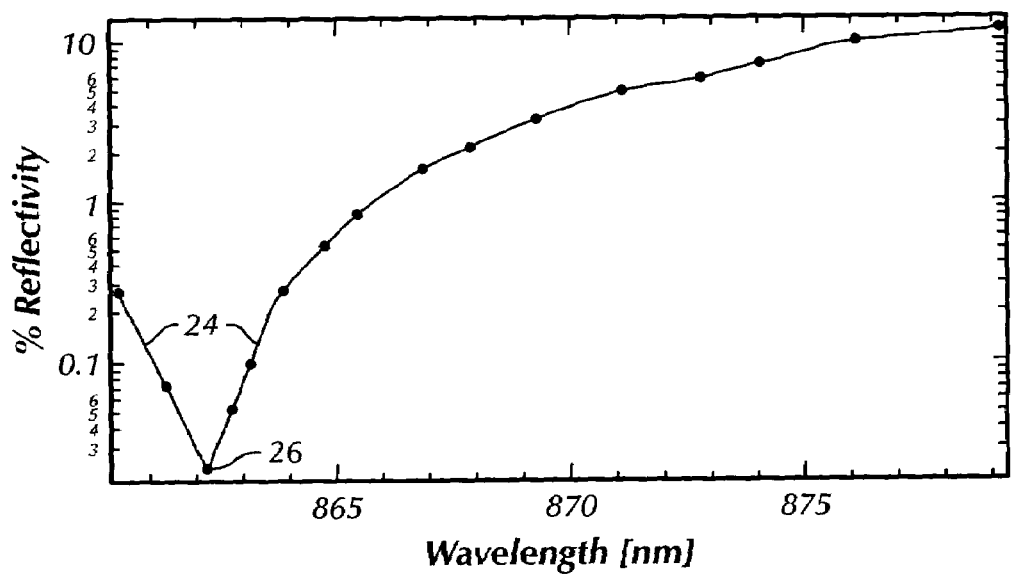
FIG. 2 is a graph that shows the observed reflectivity of a narrow-band AR coating as a function of wavelength in one embodiment.

Reference is now made to FIG. 2. Generally, the narrow-band AR coating provides a "notch AR filter" that selects a single narrow spectral width within the gain-bandwidth of the gain medium. Specifically, the narrow-band AR coating has a minimum loss point wavelength and "fall-off" on either side dependent upon the application. One example of such an AR coating for the broadband gain medium Cr:LiSAF comprises a stack of dielectric layers designed with a minimum loss point near 860 nm (a reflectivity of 0.05%), with reflectivity increasing at ±2 nm by about a factor of ten (i.e. a reflectivity of about 0.5% at 858 nm and 862 nm.) One skilled in the art could implement such a coating using any commercially available coating design software package such as OptiLayer™. In designing a suitable coating for a particular laser, additional constraints may be imposed on the coating; for example for frequency-converted lasers some antireflection properties at the converted wavelength (e.g. 430 nm) may be added to prevent stray reflections of the harmonic, if it does not unduly complicate the coating.

FIG. 2 is a graph that shows the observed reflectivity of an actual AR coating formed on Cr:LiSAF as a function of wavelength. The reflectivity is shown on the vertical axis, the wavelength is shown on the horizontal axis, and a line 24 is drawn that estimates the reflectivity curve from the data points. Due to process variations, the actual narrow-band AR coating shown in FIG. 2 has a minimum loss point 26 (center wavelength) centered at about 862.1 nm. On either side of center peak, the reflectivity of the narrow-band AR coating increases rapidly; at about 860.1 nm the reflectivity appears to have increased to about 0.29%, at about 865 nm the reflectivity appears to have increased to about 0.5%. The notch passband is about 2 nm, as determined by the 0.2% reflectivity points, which are a rise of about 10× from the minimum reflectivity of about 0.1%. In accordance with standard AR coatings, the maximum reflectivity will be about 0.05%.

For purposes of the present discussion, the narrow-band AR coating will be assumed to have only one center wavelength. Although technically the narrow-band AR coating may have other peaks, these other peaks will be so widely separated from the central wavelength that no appreciable gain would be available to support lasing operation. Therefore, effectively there is only one center wavelength. Because the narrow-band AR coating is designed for the purpose of filtering a particular spectral region rather than just reducing reflections, the central peak of the narrow-band AR filter may be slightly more reflective (i.e. more lossy) than the central peak of a broadband coating.

The narrow-band AR coating is useful to select a spectral region of the laser emission, thereby providing an initial "coarse tuning" that may then be further narrowed. For example, if the gain medium is broadband such as Cr:LiSAF which has a gain-bandwidth that can be extended to greater than 200 nm, the narrow-band AR filter shown in FIG. 2 selects a narrow spectral region (e.g. 0.2 nm) and then other laser features such as cavity modes, processes such as spatial hole burning, and elements such as etalons may be used to further narrow the linewidth of the laser emission. For example, if the gain is low (e.g. 2–4 percent per pass) (as determined by the pump intensities), then the narrow-band AR filter is not required to impart a corresponding loss by itself. The narrow-band AR filter just needs to sufficiently favor one wavelength so that other effects such as spatial hole burning (and an etalon) can be used to further narrow the bandwidth. In other words, the narrow-band AR coating cooperates with effects such as spatial hole burning to suppress laser action at wavelengths removed from the center by more than a small fraction of a nanometer (e.g. 0.25 nm to 2 nm)

If the gain medium has discrete transitions any of which can support lasing, such as Nd:YAG, then the narrow-band AR coating may be used to select one of the transitions, which can be particularly useful if the transitions are closely-spaced, such as the 946 and 937 lines in a neodymium-doped crystal. Then, other laser features, processes, and elements may be utilized to further narrow the linewidth.

Figure 3:
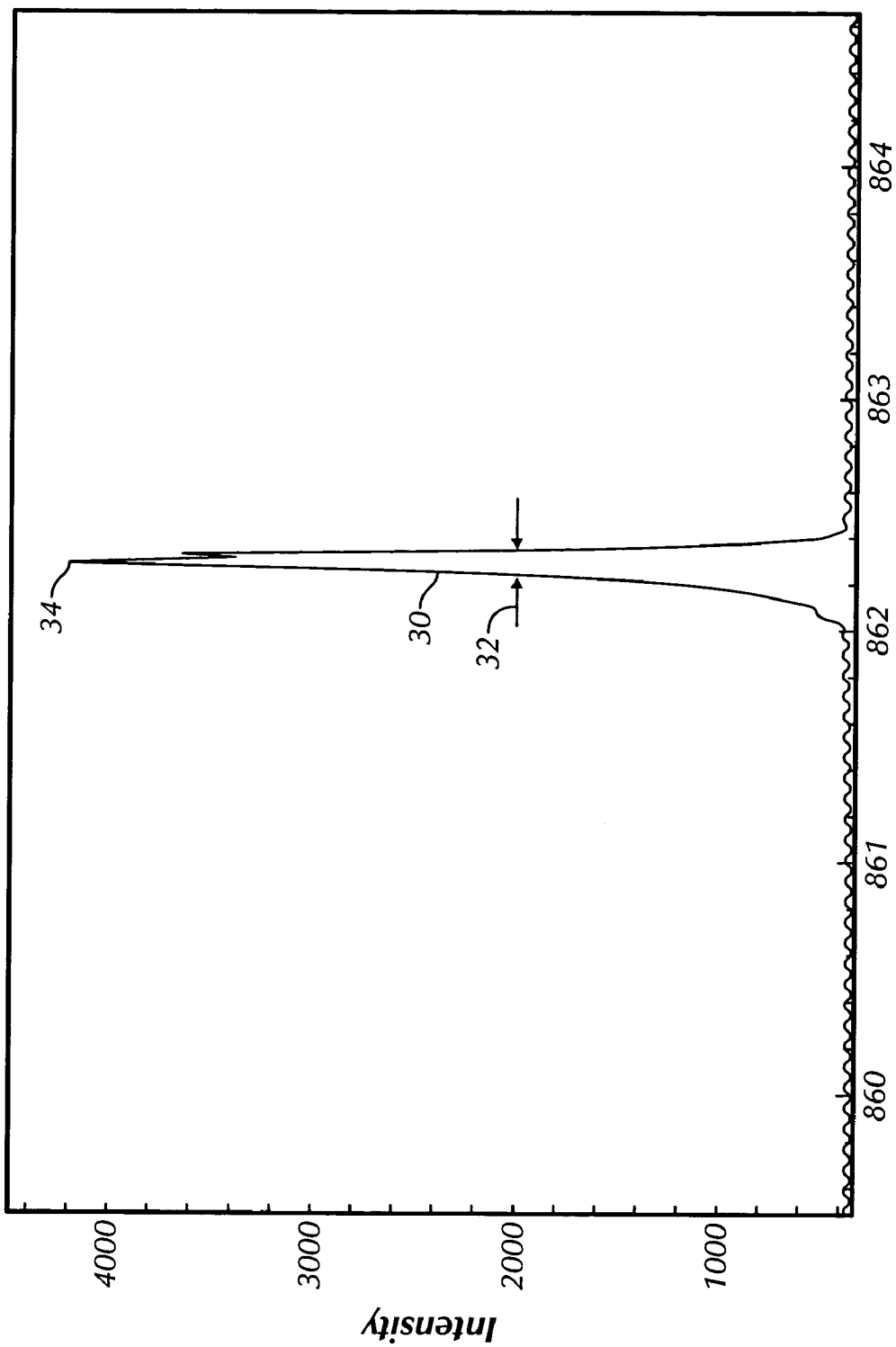
FIG. 3 is a graph that shows the output intensity as a function of wavelength in a laser as shown in FIG. 1.

FIG. 3 is a graph that shows the narrowed linewidth of a laser output resulting from use of the narrow-band AR coating shown in FIG. 2 formed on one end of a Cr:LiSAF crystal in the laser configuration of FIG. 1. Particularly, FIG. 3 is a graph that shows, at 30, the output intensity as a function of wavelength in an embodiment in which only the Cr:LiSAF crystal is in the laser cavity. These results show that the narrow-band AR coating in FIG. 2 confines laser operation to a narrow linewidth of approximately less than 0.2 nm FWHM (shown at 32), a peak intensity 34 centered at about 862.2 nm, and an output power that is significantly greater at this wavelength than most previous lasers built using BRFs.

It may be noted that the broad available laser bandwidth (>100 nm) of Cr:LiSAF allows lasing operation over a wide range of wavelengths, and therefore as shown in FIG. 3 lasing operation was achieved and a narrow portion of the available laser bandwidth was selected even though the actual minimum loss point of the narrow-band AR coating at 862.1 nm was about 2 nm from the intended wavelength of 860 nm. One advantage of using a broadband gain medium such as Cr:LiSAF is relative insensitivity of output power to shifts of a few nanometers in the center wavelength of the coating, since the available gain does not vary widely in this region. This insensitivity can be useful to simplify process control and to improve maunfacturing yield while still providing an output wavelength within a desired range.

In one described embodiment such as shown in FIG. 2, the narrow-band AR coating is formed on a Cr:LiSAF crystal with a bandwith as defined at the points at which the reflectivity increases by about 10× (of about two nanometers). In other embodiments, the narrow-band AR coating is formed to provide a bandwidth sufficient to make the initial coarse tuning that then allows other laser features, processes, and elements to further narrow the linewidth to the extent required by a particular implementation.

Figure 4:
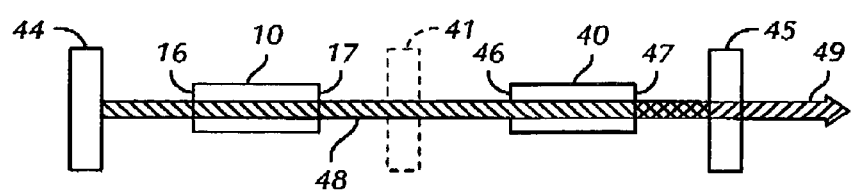
FIG. 4 is a side view of a frequency-converted laser that includes a gain medium, a nonlinear element, and a narrow-band AR coating.

FIG. 4 is a side view of a frequency-converted laser that, in addition to the elements discussed with reference to FIG. 1 includes a nonlinear element 40 such as LBO. Particularly, the nonlinear element 40 and gain medium 10 are situated within a laser cavity 42 defined between a first end mirror 44 and a second end mirror 45. The first and second end mirrors are coated for high reflectivity at the fundamental emission, and in addition, the second end mirror is coated for anti-reflection at the converted frequency (e.g the doubled frequency). An optional etalon is shown in dashed lines at 41. At least one of the intracavity surfaces is coated with a narrow-band AR coating to provide a notch AR filter as described herein.

The gain medium 10 comprises a solid state gain medium. Both of its surfaces 16 and 17 are typically AR coated. In one embodiment, one surface (typically the surface 17 distal from the first end mirror 17) is coated with a narrow-band AR filter described herein. The other surface may be coated with a standard AR coating to reduce reflections. In other embodiments, both surfaces may be coated with a standard AR coating.

The non-linear element 40 comprises any suitable frequency-conversion element, such as an LBO crystal. In some embodiments the surfaces 46 and 47 of the nonlinear element are AR-coated at both the fundamental emission and at the frequency-converted wavelength. In other embodiments, one of the surfaces may be coated with a narrow-band AR coating to provide a notch AR filter as described herein.

In operation, the fundamental emission 48 generated within the laser cavity 42 is frequency-converted by the nonlinear element to provide a frequency-converted output 49 and accordingly, the nonlinear element 40 is arranged within the laser cavity 42 to provide the desired frequency conversion effect. In one embodiment in which Cr:LiSAF is the gain medium, the nonlinear element may be arranged for frequency doubling the fundamental emission; for example it may double a fundamental emission of 862 nm (near-infrared) to 431 nm (blue).

Figure 5:
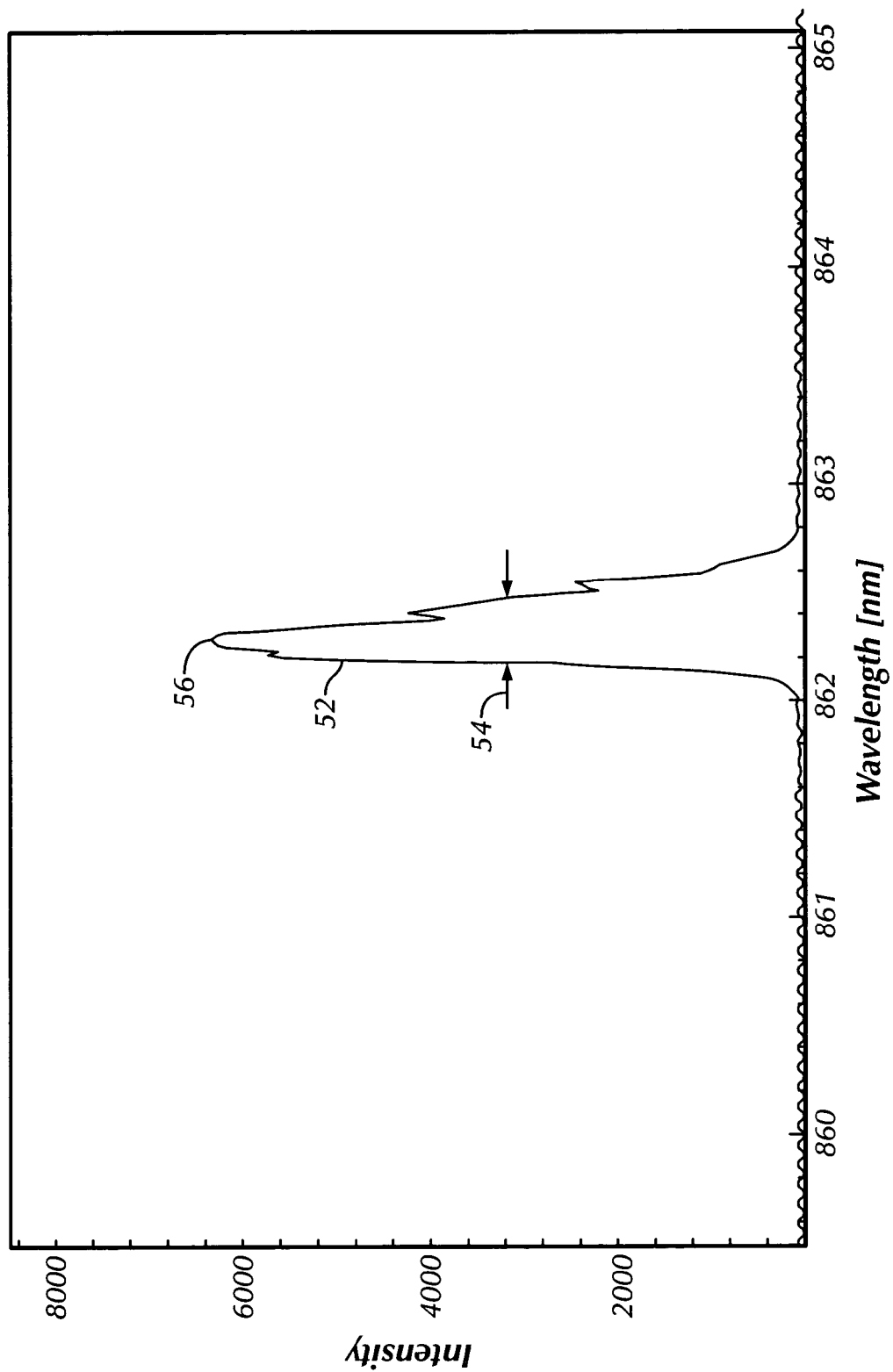
FIG. 5 is a graph that shows experimental results (output intensity as a function of wavelength) using one embodiment of the laser of FIG. 4.

FIG. 5 is a graph that shows, at 52, experimental results (output intensity as a function of wavelength) using one embodiment of a frequency-doubled laser such as shown in FIG. 4. Specifically, an LBO frequency doubling crystal was inserted into a laser cavity in which the narrow-band AR coating shown in FIG. 2 was formed on one end of a Cr:LiSAF crystal. As shown by the graph of FIG. 5, the linewidth, as measured by the FWHM shown at 54, was broadened to about 0.6 nm, due to the additional losses imparted by the insertion of the LBO crystal and the nonlinear process involved in frequency doubling. These increased losses effectively make the notch AR losses near the minimum less important and allow the laser action to occur over a wider frequency range, albeit with a reduced total power due to the additional loss. The peak intensity of the fundamental emission was about 862.3 nm. In this implementation, it was observed that the laser provided frequency-doubled (blue) laser output at 431 nm with a power well in excess of 40 mW. It may be noted that the total power of the fundamental emission is reduced by the additional loss created by the nonlinear element in converting the fundamental emission to blue. The frequency doubling (i.e. second harmonic generation or "SHG") to blue can be thought of another loss mechanism; accordingly the design of the laser may be meant to make SHG the primary loss mechanism for the fundamental.

As will be discussed with reference to FIG. 6 for example, even though the linewidth has been broadened somewhat to about 0.6 nm, it is still narrow enough that it can be made single frequency with the addition of a single low-loss (e.g. substantially uncoated) etalon into the cavity.

Figure 6:
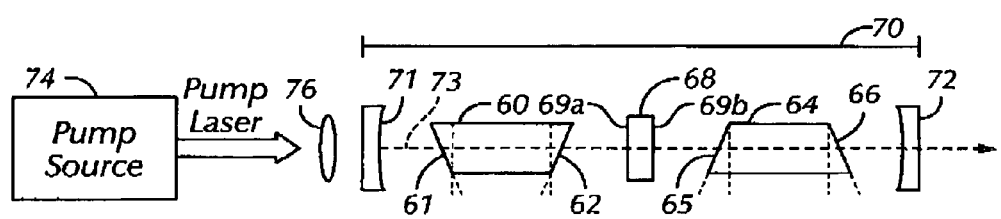
FIG. 6 is a side view of one embodiment of a frequency-doubled laser that includes a low loss etalon that significantly narrows the linewidth of the fundamental emission to provide single frequency fundamental emission within the laser cavity.

FIG. 6 is a diagram of one embodiment of a frequency-doubled laser that additionally includes an etalon that significantly narrows the linewidth of the fundamental emission to provide single frequency (i.e. single longitudinal mode) fundamental emission within the laser cavity. Single longitudinal mode operation of the fundamental emission in a frequency-doubled laser-greatly improves laser stability by avoiding nonlinear interactions that would otherwise interfere with the frequency conversion process. Advantageously, the etalon may be substantially uncoated and thereby introduce only a low loss into the laser cavity.

The single longitudinal mode, frequency-doubled laser shown in FIG. 6 includes a solid state gain medium 60, a nonlinear material 64, and an etalon 68 situated betwen the gain medium and the nonlinear material. These elements are situated within a laser cavity 70 defined between a first mirror 71 (an input mirror) and a second end mirror 72 (an output coupler). An optical pump source 74 such as a laser diode (or an array of laser diodes) is arranged to end pump the gain medium. Suitable optics, such as the collimating and focusing lenses shown at 76, may be provided to deliver the pump light into the gain medium 70.

The gain medium comprises any suitable solid state gain medium. For example, the gain medium may comprise a chromium-doped broadband gain medium such as Cr:LiSAF, Ti:$Al_2O_3$, Alexandrite, Cr:Forsterite, or Cr:LiSGAF or a neodymium-doped gain medium such as Nd:YAG or Nd:YLF that have a series of discrete transitions that can lase.

Because the low gain reduces the loss necessary to suppress lasing outside of the desired region, a gain medium that has a low gain (e.g. Cr:LiSAF) may have advantages in making it feasible to sufficiently suppress undesired longitudinal and spatial modes with an AR filter. Because the low gain reduces the bandwidth susceptible to lasing, and AR filters typically do not have a significant increase in reflectivity on either side of the center frequency, gain medium with low gain are particularly suitable for frequency-narrowing with the notch AR filter described herein. Furthermore, the low gain eases the requirements on the other frequency-narrowing components such as the etalon that provide single longitudinal mode operation. However, gain media with higher gain can be used; with the caveat that the frequency-narrowing requirements will be more stringent for a high gain medium than for a low gain medium, or the output may have a higher bandwidth. Higher gain media can be advantageous because they can lase even with larger losses in the cavity, and they have a higher limit for power extraction.

In the illustrated embodiment the solid state gain medium 60 comprises a wedged configuration including a first angled surface 61 proximate to the pump source and a second angled surface 62 opposite thereto. Each of these angled surfaces has a nonzero angle with respect to the optical axis 73. This nonzero angle is typically chosen so that it is slightly off normal to the optical axis by a few multiples of the beam divergence angle of the fundamental emission within the laser cavity. For example this angle may be about 0.5 to 3.0°, usually about 1°. The chosen angle is large enough to direct any reflected light off the optical axis of the laser cavity, thereby ejecting it from the laser cavity and preventing any unwanted interactions or unwanted etalon effects between intracavity surfaces. The second angled surface may be coated with a narrow-band AR filter described herein such as with reference to FIG. 2. The first angled surface may be coated with a standard AR coating to reduce reflections at the wavelengths of the fundamental emission and the pump source.

Generally, the notch passband defined by the narrow-band AR filter should be narrow enough that it passes no more than one etalon maxima (as determined with reference to the etalon and other loss mechanisms such as spatial hole burning); all other maxima should be sufficiently suppressed by the notch of the AR filter or other loss mechanisms. It may be noted that, due to manufacturing tolerances, the notch passband and center frequency may differ from the design goal and therefore, the narrow-band AR coating may be characterized before it is inserted into a laser or during manufacturing; for example the gain medium may first be inserted into the laser cavity, and then an appropriate etalon may be chosen (e.g. by trial and error) to provide at least a predetermined linewidth and power output.

The nonlinear element 64 comprises any suitable material such as LBO or LiNBO arranged within the laser cavity to provide the desired frequency conversion effect. Specifically, the nonlinear element is arranged with a particular orientation and location within the laser cavity in order to provide the desired frequency conversion. In one embodiment in which Cr:LiSAF is the gain medium, it may be arranged to frequency double the fundamental emission; for example it may double a fundamental emission of 862 nm (near-infrared) to 431 nm (blue) using a type I orientation. It may be noted that the arrangement of the nonlinear element within the laser cavity is designed to produce efficient frequency conversion at a single, predetermined wavelength of the fundamental emission within a very narrow range (e.g. ±1 nm for a 1 cm crystal of LBO@860 nm). Any wavelength shift outside that wavelength range could cause efficiency to drop, and even completely prevent frequency conversion if the wavelength shift is too large. In other words, the efficiency of the frequency conversion process is highly sensitive to the wavelength of the fundamental emission. As will be discussed, the narrow-band AR filter, in conjunction with other cavity elements such as the etalon, advantageously restricts the fundamental emission to within the range of efficient frequency conversion. In other words, even if the single frequency fundamental emission shifts slightly, the narrow-band AR filter prevents shift outside the range of efficient frequency conversion.

In the illustrated embodiment of FIG. 6 the nonlinear element 64 comprises a wedged configuration including a first angled surface 65 proximate to the etalon and a second angled surface 66 opposite thereto. Each of these angled surfaces has a nonzero angle with respect to the optical axis 73 defined by the laser cavity, for example this angle may be about 1°. Typically, this nonzero angle is chosen so that it is slightly off of normal to the optical axis by a few multiples of the beam divergence angle of the fundamental emission. Both angled surfaces may be coated with a standard broadband AR coating to reduce reflections at the wavelength of the fundamental emission. However, in some embodiments, for reasons such as cost or difficulty of coating, one of the angled surfaces 65, 66 on the nonlinear element may comprise the narrow-band AR coating instead of the gain medium.

The etalon 68, which is situated between the gain medium and the nonlinear crystal, comprises any suitable optical material such as undoped YAG formed with two polished, substantially parallel surfaces 69a, 69b. These two outer surfaces are typically arranged at a nonzero angle to the optical axis, this nonzero angle typically chosen so that it is slightly off of normal to the optical axis by a few multiples of the beam divergence angle of the fundamental emission. The etalon has a thickness designed so that no more than one of its maxima fall within the notch passband.

In order to design the etalon, the free spectral range (FSR) must be determined, which in turn determines the physical thickness of the etalon. In one embodiment, an uncoated YAG etalon with an FSR of about 1.2 nm @860 nm was utilized, which had a width of about 150 microns between the opposing parallel surfaces 69. The width of the etalon determines the FSR in accordance with the well known relation: FSR≈c/2nL, where c is the speed light in free space, n is the index of refraction, and L is the etalon width. From this relation, it can be seen that an increasingly thinner etalon is required to provide wider FSRs. For material and manufacturing reasons, it is generally advantageous to keep the FSR as narrow as possible, which allows the etalon to be built thicker (wider), which in turn makes the etalon easier to handle and less subject to breakage. Generally, etalons become difficult to fabricate below 30 to 60 microns.

Due to the low finesse requirements caused in part by suppression of several adjacent modes by spatial hole burning, the outer surfaces are substantially uncoated (i.e. finesse≈1) and therefore this etalon advantageously introduces only a very low loss into the laser cavity. The low loss is an advantage because it improves efficiency; and furthermore, for media such as Cr:LiSAF that have low gain, the low loss of the etalon maintains the low laser threshold and improves operation as compared to typical etalons that require more highly reflective outer surfaces to provide higher finesse such as two or more. The finesse of an etalon with equal reflectivity R on both sides is determined by the well-known formula: $F=\pi \cdot [sqrt(R/(1-R))]$. Therefore, it can be seen that the finesse increases relatively slowly with reflectivity; for example a reflectivity R of only 8% gives a finesse F=1, an R of 24% gives F=2. It may be noted that an uncoated etalon does not have zero reflectivity, as there will be Fresnel reflections to provide a nonzero reflectivity; for example Fresnel reflection at an uncoated YAG:air interface at 860 nm is approximately 8% per surface. By itself this would be enough to suppress laser action if not for the internal interference between the multiple reflections in the etalon reduce the net field at the interface for resonant frequencies and virtually eliminate surface reflections at those frequencies, which is one explanation as to why the etalon is very low loss for some frequencies but not for others. It may be noted that the uncoated etalon should not necessarily be designed with too high a reflectivity, because high index materials have high surface reflections, but also tend to absorb more due to the physical relationship between absorption and the refractive index.

However, the low finesse of the uncoated etalon has a lesser depth of frequency selection than a higher finesse etalon. For example an uncoated etalon has a frequency selection curve that is almost sinusoidal, with a maximum of about 100% and a minimum of about 70%. However, it is believed that the frequency selection features of the narrow-band AR coating (the notch AR filter) reduce the requirements of the etalon sufficiently that even an uncoated etalon can provide single frequency operation. Thus, the bandwidth of the narrow-band AR coating may be designed to complement the etalon in such a way as to produce single frequency operation; for example a slightly broader band AR coating may require an etalon with slightly more finesse.

It may be noted that the laser cavity 70 has a very high finesse; particularly, the totally reflective input mirror 71 and output coupler 72 provide a high finesse optical cavity at the fundamental emission. Thus, the laser cavity 70 defines a series of very sharp longitudinal modes whose wavelength spacing (FSR) is determined by the optical length of the cavity. In DPSSL lasers with linear cavities, for example, typical optical path lengths vary from 10 to 50 mm, and therefore the cavity mode spacing may be from about 3 GHz to about 15 GHz (which translates to about 0.037 nm to about 0.007 nm @860 nm). Due to the high cavity finesse, the actual linewidths of the lasing cavity modes are typically at least two orders of magnitue (100×) narrower.

In order to provide single frequency operation, only one of these longitudinal modes can be allowed to lase, and therefore the narrow-band AR filter, the etalon, and the cavity length are designed for this purpose. In one embodiment, due to the location of the Cr:LiSAF crystal within the laser cavity (close to the input mirror), and the cavity length which determines the longitudinal modes, several longitudinal cavity modes adjacent to the central mode are suppressed by spatial hole burning, so that the etalon need only suppress cavity modes separated by three, four, or more cavity free spectral ranges (FSR) from the central mode. This determines the allowable FSR of the etalon, and thus determines the maximum range of frequencies that the notch AR can allow to oscillate. In other words, the suppressed number of cavity modes determines the allowable FSR of the etalon, with the design goal that the FSR should allow only one of the cavity modes to oscillate. The narrow-band AR coating is designed to select only one of the etalon modes to oscillate. The FSR thus determines the maximum range of frequencies that the narrow-band AR coating can allow to oscillate.

Thus, for any particular embodiment, the frequency selection elements (e.g. the narrow-band AR coating and the etalon) are designed with respect to a comparison of the available gain vs. total loss at each frequency. For example, to design a single longitudinal mode laser, a design goal is to allow only one narrow cavity mode to be above threshold and simultaneously impose a minimum loss possible on the selected mode.

As discussed above, the efficiency of the frequency conversion process is highly dependent upon the frequency of the fundamental emission, due to the particular arrangement of the nonlinear element within a particular laser cavity. Advantageously, the narrow-band AR coating is designed in conjunction with other cavity elements such as the etalon to provide a spectral response that prevents the fundamental emission from shifting outside the range of efficient frequency conversion.

Furthermore, the narrow-band AR coating is designed to meet the requirements of the gain medium, which can vary between embodiments. For example, for cw operation of a low gain material such as Cr:LiSAF, an increase of reflectance to 0.2% on the narrow-band AR coating is enough to spectrally confine laser operation. Of course the low available gain also demands that the minimum reflectivity of the coating be correspondingly low (e.g. <0.03%) to allow practical, efficient laser operation. Conversely, a higher gain material such as Nd:YAG might require a reflectivity of several percent to suppress lasing on a strong transition, but would have a correspondingly reduced requirement for minimum loss.

In one implementation, the laser cavity 70 has a physical length of about 22–25 mm (an optical length of about 30 mm), the gain medium 60 comprises Cr:LiSAF with a length of about 4 mm situated about 1–2 mm from the input mirror 71, the nonlinear material 64 comprises LBO with a length of about 7 mm situated about 1 mm from the output coupler 72, and the etalon 68 is placed at any suitable location between the gain medium and the nonlinear material. In this implementation, the pump source 74 includes a laser diode emitting a pump beam at 670 nm, the input mirror 71 and the output coupler 72 are coated to be highly reflective at a fundamental emission of about 860 nm, and the output coupler 72 is further coated to be anti-reflective at the doubled frequency of about 430 nm.

Figure 7:
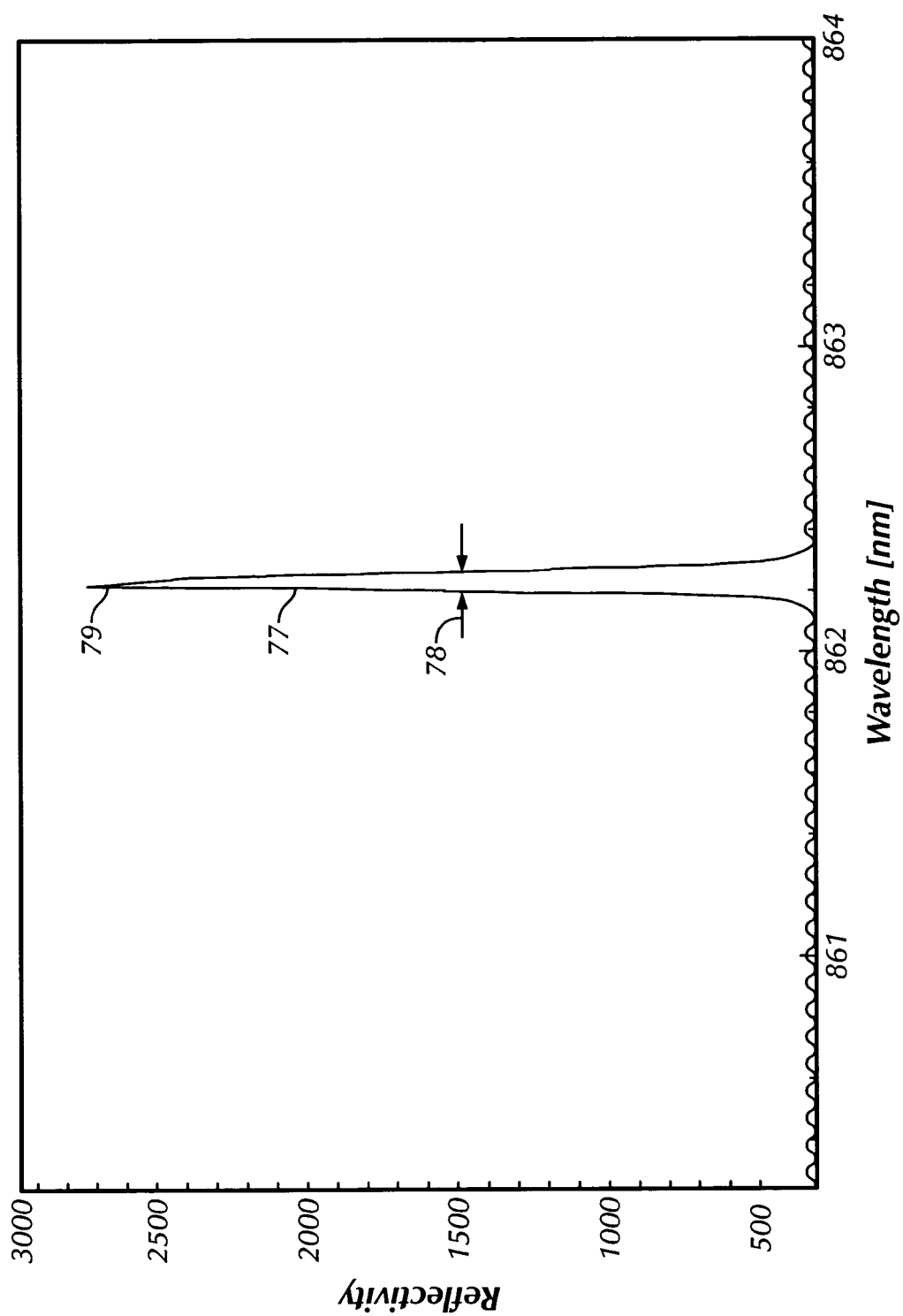
FIG. 7 is a graph of the output intensity as a function of wavelength of the fundamental emission of one embodiment of the frequency-converted laser with an etalon shown in FIG. 6.

FIG. 7 is a graph that shows the experimentally-observed spectrum of the fundamental emission after the insertion of the etalon (FSR=1.2 nm) into a frequency doubled laser in which the gain medium was Cr:LiSAF and the narrow-band AR coating shown in FIG. 2 was formed on one end of a Cr:LiSAF crystal. Specifically, at 77, FIG. 7 plots the output intensity as a function of wavelength of the fundamental emission of the embodiment shown in FIG. 6. As shown in FIG. 7, the laser operated quietly on a single frequency and the spectral width narrowed to less than the measurement resolution of the spectrometer. (Although a 0.1 nm FWHM is shown at 78, the actual FWHM is believed to be less than about 0.002 nm). The peak intensity was centered at about 862.24 nm. In this experiment, it may be noted that the fundamental emission retained approximately 50% of the power seen without the etalon. It also exhibited low sensitivity to cavity temperature and pump laser power variations. One advantage is that this laser became easier to manufacture: the build time for this unit decreased significantly.

Figure 8:
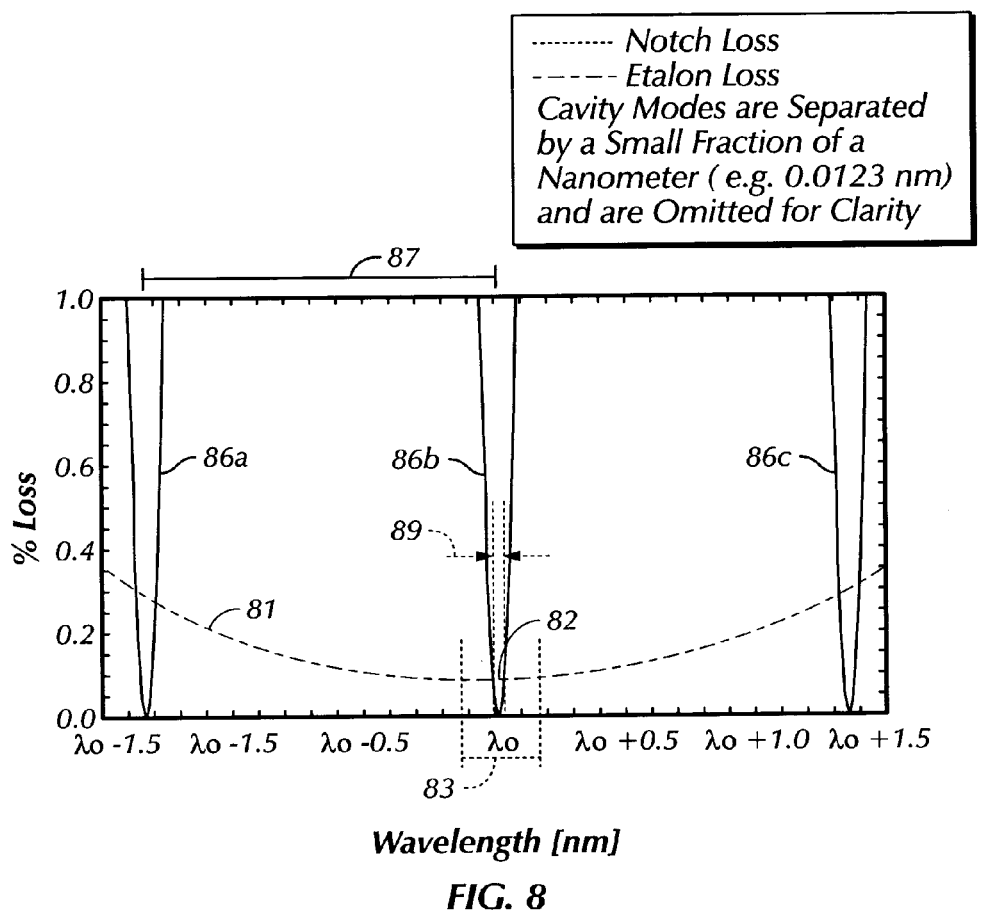
FIG. 8 is a graph that plots loss vs. wavelength for one example of the narrow-band AR coating described herein, and one example of an etalon, which is used to illustrate the interaction between the narrow-band AR coating, the etalon, and the gain-bandwidth of the gain medium to generate narrow bandwidth laser emission in one embodiment.

FIG. 8 is a graph used herein to illustrate cooperation between the narrow-band AR coating, the etalon, and the gain-bandwidth of the gain medium to generate narrow bandwidth laser emission in one embodiment. Specifically, the graph of FIG. 8 shows loss (as a percentage) on the vertical axis as a function of wavelength, which is shown along the horizontal axis. For reference purposes, the center wavelength of the narrow-band AR coating is labeled "$\lambda o$". The center wavelength can be anywhere within the gain-bandwidth of the laser medium; for example for Cr:LiSAF the center wavelength may be within a range of about 760 nm to about 1000 nm, and in one embodiment around 860 nm. The gain-bandwidth for Cr:LiSAF is approximately flat around 860 nm, and may have a gain of about 3% in one example, depending upon the pumping energy.

For description purposes first the effect of utilizing the narrow-band AR filter within the laser cavity will be discussed, and then the further effect of adding the etalon after the AR filter will be discussed. A loss curve 81 for a narrow-band AR filter in one embodiment shows a minimum loss point 82 at about the center wavelength of the fundamental emission. For a broadband gain medium that has a substantially flat gain bandwidth curve, the narrow-band AR coating together with all of the cavity losses allows only a portion of that gain bandwidth to lase. In FIG. 8, this allowed portion is represented by a spectral width 83 that in this example is about 0.3 nm (±0.15 nm from the center wavelength). In some embodiments, depending upon the amount of the other cavity losses, the spectral width may vary; for example it may be about 4 nm, 2 nm, 1 nm, 0.5 nm 0.25 nm, or smaller. For example, the other cavity losses may be created by optical losses in the end mirrors, absorption in optical materials in the path of the laser emission, and unwanted reflections. Generally, a gain medium will lase if the cavity losses are less than the available gain.

Adding the etalon into the laser cavity provides further wavelength selectivity. The periodic etalon transmission peaks are illustrated at 86a, 86b, and 86c, and each has a maximum that is separated from the adjacent maxima by an FSR (shown at 87) determined by the width of the etalon. The FSR is selected so that, as shown, only one transmission peak (illustrated at 86b) falls within the spectral width allowed by the narrow-band AR coating.

Furthermore, as can be seen in FIG. 8, the etalon transmission peaks are very sharp compared with the narrow-band AR coating, dropping off quickly on either side, and therefore the etalon provides a much narrower spectral width than the narrow-band AR coating. Particularly as shown at 89, the bandwidth allowed by the etalon is about 0.05 nm, which is much narrower than the bandwidth allowed by the narrow-band AR filter.

The already narrowed bandwidth is further narrowed by two additional processes: longitudinal cavity modes and spatial hole burning. The cavity modes are determined by spacing between the end mirrors in the laser cavity, and provide very sharp, very narrow transmission peaks. However for almost all lasers except microchip lasers, the cavity modes are very closely spaced; in one example a compact laser has longitudinal mode spacings of about 0.0123 nm, which are too closely spaced to show effectively on FIG. 8. These longitudinal modes further limit the narrowed bandwidth, and another process—spatial hole burning—discussed above, reduces the number of adjacent longitudinal modes that can oscillate at any one time. All these processes together can provide single frequency (i.e. single longitudinal mode) operation.

Figure 9:
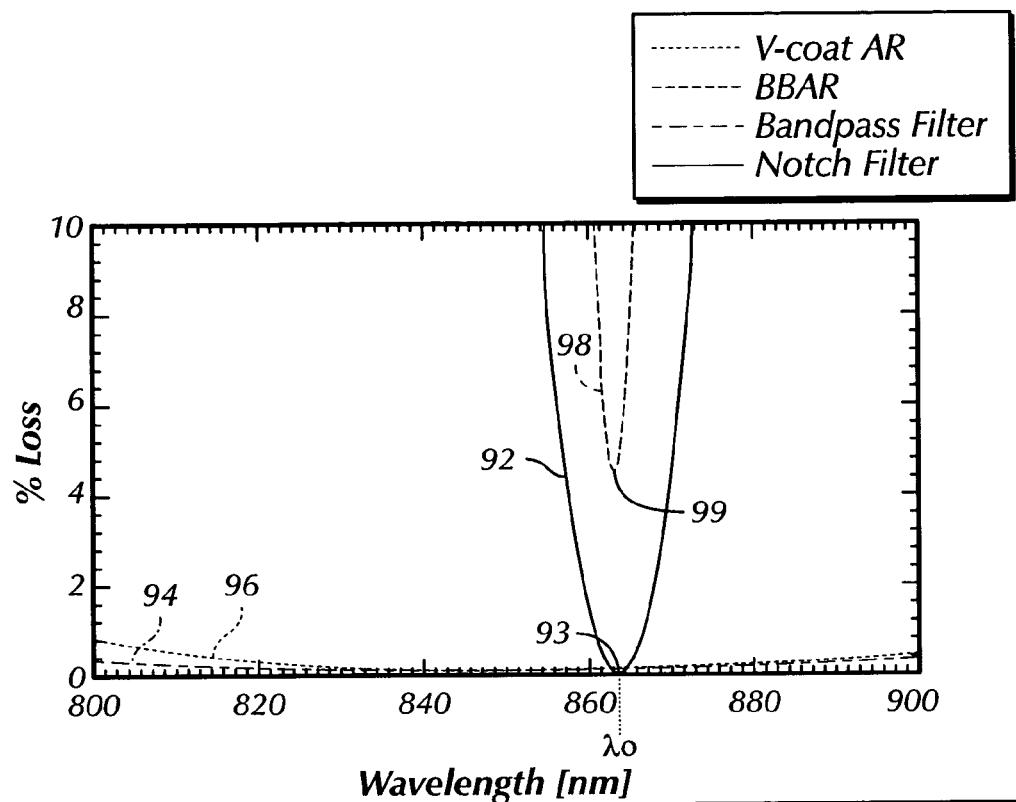
FIG. 9 is a graph of the theoretical spectral response of a narrow-band AR filter as described herein, a conventional broadband AR coating, and a conventional bandpass filter over a range of about 100 nm (from 800 nm to 900 nm) and a loss of 0% to 10%.
Figure 10:
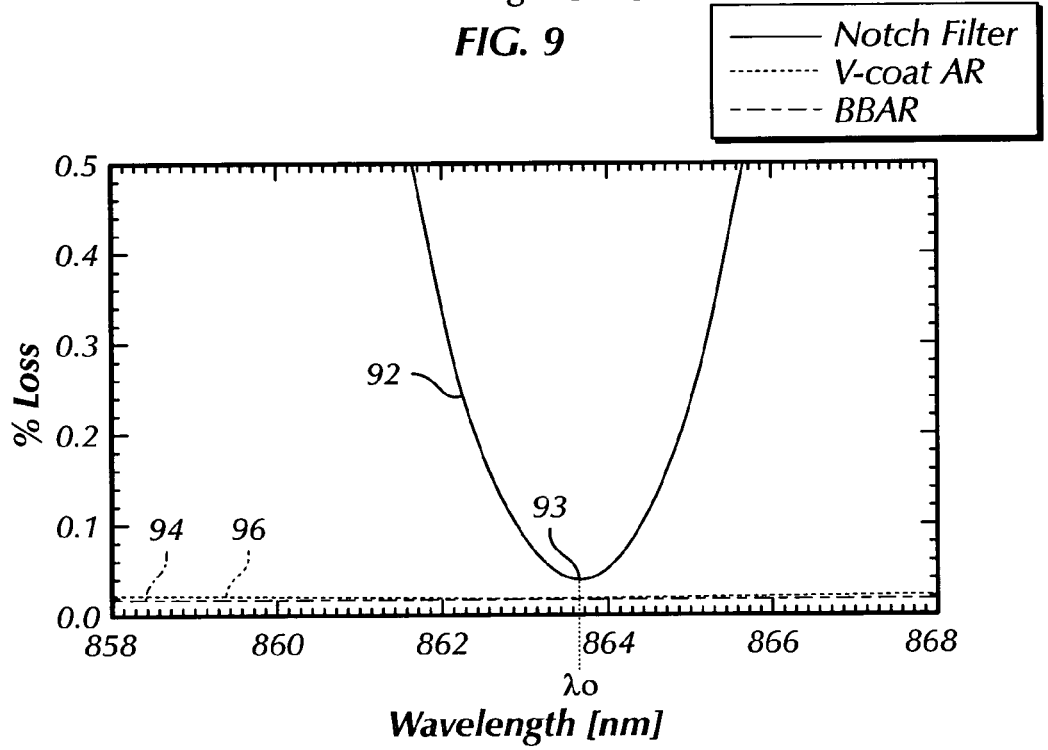
FIG. 10 is a magnified view of the spectral response as in FIG. 9 over a smaller range of about 10 nm (from 858 nm to 868 nm) and a loss of 0.0% to 0.5%.

Reference is now made to FIGS. 9 and 10 to compare the spectral response of a narrow-band AR coating described herein with conventional AR coatings and conventional bandpass coatings. Specifically, the graph of FIG. 9 plots the theoretical spectral response (loss vs. wavelength) for one example of these coatings over a range of about 100 nm (from 800 nm to 900 nm) and a loss of 0% to 10%. FIG. 10 plots the spectral response over a smaller range of about 10 nm (from 858 nm to 868 nm) and a loss of 0.0% to 0.5%. For convenience all plots have a minimum loss point designed at λo.

At 92, the spectral response of a narrow-band AR coating such as described herein is illustrated. As can be seen the narrow-band AR coating has a minimum loss point 93 with about 0.05% loss. At 0.5% loss (10×) the bandwidth is about 4 nm, and at 10% loss the bandwidth is about 18 nm.

At 94, the spectral response of a conventional AR coating is illustrated. At the minimum, the loss is less than 0.02%, and increases only slightly over the 10 nm range. The loss is below 0.5% across the entire 100 nm range.

At 96, the spectral response of another type of conventional broadband AR coating, commonly termed a "v-coating", is illustrated. Like the conventional broadband AR coating shown at 94, the minimum loss is less than 0.02%, and increases only slightly over the 10 nm range. However, across the entire 100 nm range, the loss is larger but still less than 1%.

At 98, the spectral response of a conventional bandpass filter is illustrated. As can be seen, the bandpass filter has a relatively high minimum loss (shown at 99) of about 4.5%. Therefore for that reason alone such bandpass filters are entirely unusable for gain media that have low gain, such as the 3% gain of Cr:LiSAF. At 10% loss, the bandwidth is only 3 nm. Therefore the bandpass filter characterized at 98 has much steeper sides than the narrowband AR filter to provide more loss at nearby wavelengths, and a significantly higher minimum loss.

Figure 11:
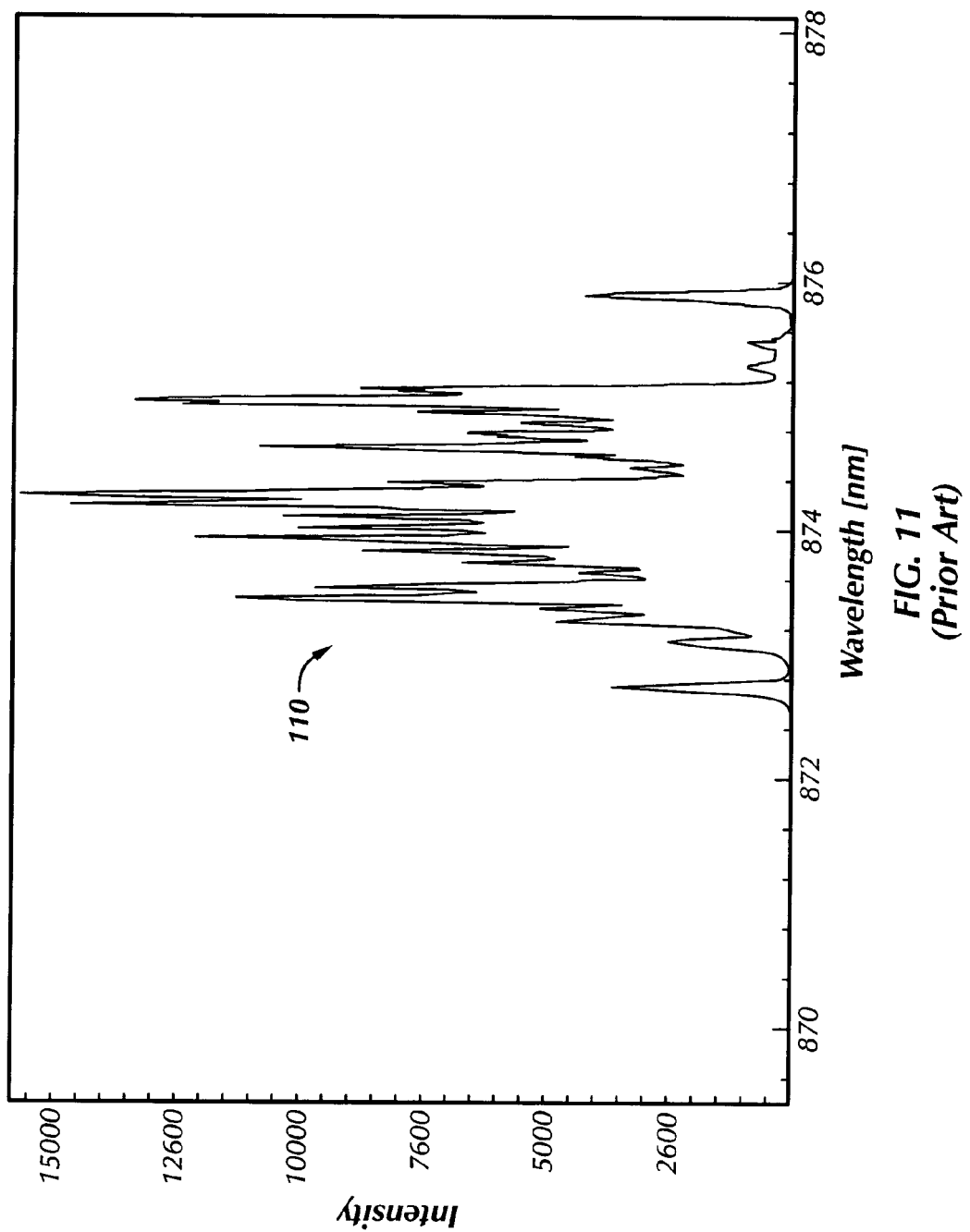
FIG. 11 is a graph of the output intensity of the fundamental emission vs. wavelength for a simple laser cavity containing only the gain medium Cr:LiSAF with conventional broadband AR coatings on both surfaces.

FIG. 11 illustrates the effect of utilizing a conventional broadband AR coating in a laser cavity such as shown in FIG. 1 that has no frequency-converting elements. Specifically, FIG. 11 is a graph that plots at 110 the output intensity of the fundamental emission vs. wavelength for a simple laser cavity containing only the gain medium Cr:LiSAF with broadband AR coatings on both surfaces. As can be seen, the lasing wavelengths extend over a range of about 4 nm, and show very significant intensity fluctuations over that range from 0% to 100%. In other words, this laser does not operate in a well-defined frequency range and the distribution shown can vary significantly with time. This makes this laser unsuitable for most uses including any uses requiring intracavity second harmonic generation. Furthermore, from this scan of the laser output spectrum, it can be seen that the emission is shifted to approx 875 nm due to the specifics of the coating and the emission/absorption of Cr:LiSAF. The gain is actually declining slightly from its peak near 820–840 nm, but so are the absorption losses in this three-level laser material.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A frequency-converted laser comprising:
    a laser cavity including a first and a second end mirror;
    a gain medium situated within said laser cavity, said gain medium defining a gain-bandwidth;
    a pump source arranged to pump said gain medium to thereby excite laser emission within said laser cavity;
    a nonlinear element situated within said laser cavity, said nonlinear element arranged for frequency conversion of said laser emission within a required spectral range for efficient frequency conversion;
    an AR coating formed on a transmissive surface within said laser cavity, said AR coating defining a minimum loss point within said gain-bandwidth of said gain medium;
    wherein said AR coating constrains the bandwidth of said laser emission within said required spectral range for frequency conversion; and
    an etalon situated within said laser cavity, wherein said etalon has an FSR greater than said required spectral range, so that said etalon has at most one transmission peak within said spectral range, and said etalon and said AR coating operate cooperatively to constrain the bandwidth of said laser emission within said required spectral range for frequency conversion.

2. The laser of claim 1 wherein said gain medium and said laser cavity are arranged to suppress at least three adjacent longitudinal modes by spatial hole burning.

3. The laser of claim 1 wherein said fundamental emission is substantially single frequency.

4. The laser of claim 1 wherein said AR coating has a minimum loss point of less than about 1%.

5. The laser of claim 4 wherein said AR coating has a minimum loss point of less than about 0.5%.

6. The laser of claim 4 wherein said AR coating has a minimum loss point of less than about 0.2%.

7. The laser of claim 1 wherein said laser emission is constrained to substantially single frequency by said etalon and said AR coating.

8. The laser of claim 1 wherein said etalon is substantially uncoated.

9. The laser of claim 1 wherein said gain medium comprises a solid state gain medium.

10. The laser of claim 1 wherein said laser cavity defines an optical axis, said gain medium comprises a first optical face and a second optical face situated along the optical axis, and said AR coating is formed on said second optical face.

11. The laser of claim 1 wherein said gain medium provides a gain amplification of said laser emission of less than about 4% per pass.

12. The laser of claim 1 wherein said gain medium comprises a broadband gain medium.

13. The laser of claim 12 wherein said gain medium comprises a chromium-doped solid state gain medium.

14. The laser of claim 1 wherein said gain medium comprises a gain medium that lases at discrete transitions, and said AR coating selects one of said transitions.

15. The laser of claim 14 wherein said gain medium comprises a rare-earth doped solid state gain medium.

16. The laser of claim 1 wherein said pump source comprises:
    an optical pump source; and
    means for focusing optical radiation from said optical pump source into said gain medium.

* * * * *